Sept. 30, 1952 J. W. STUFFT 2,612,286
CLOSURE AND SEAL THEREFOR
Filed April 29, 1947
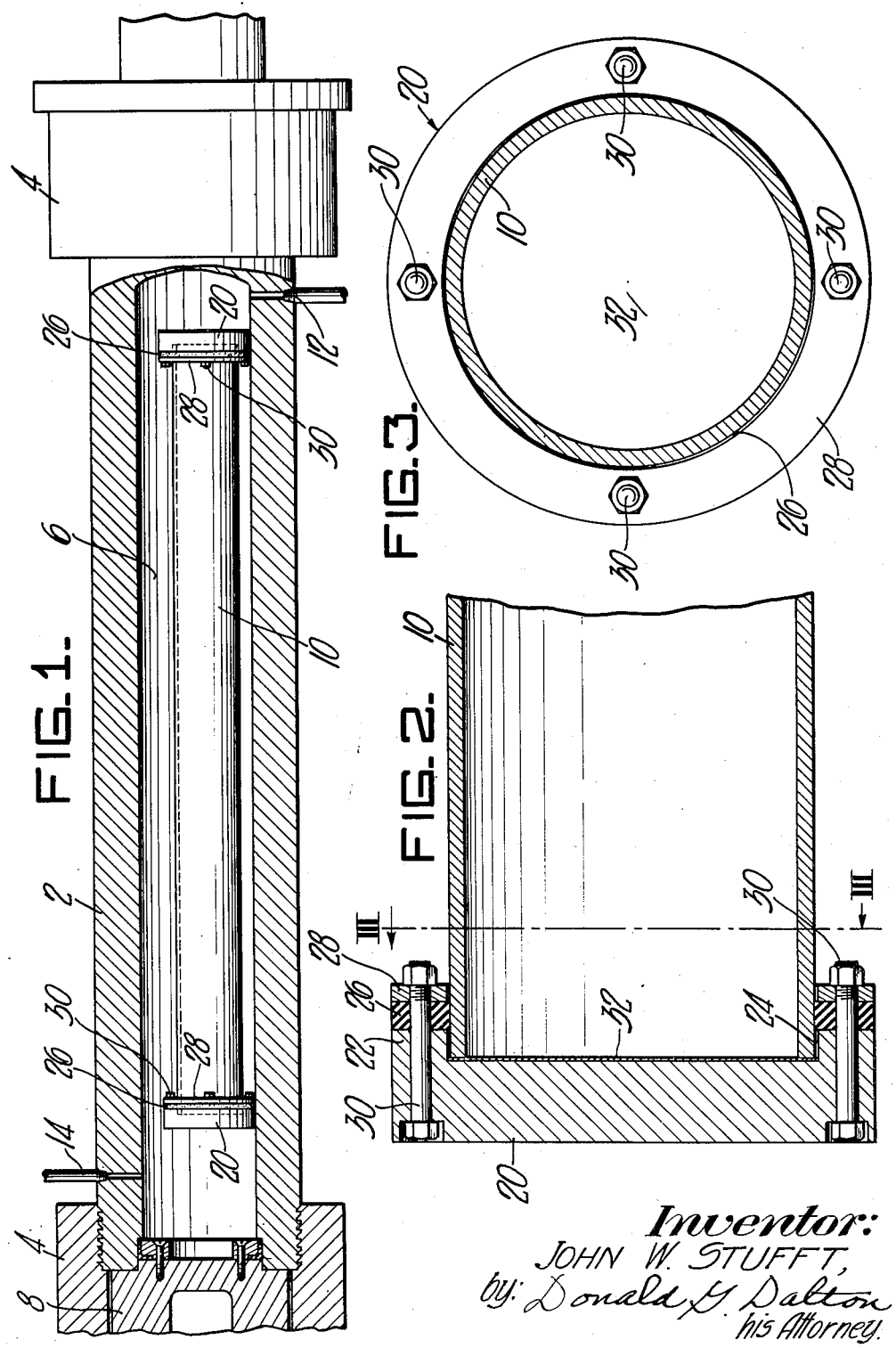
Inventor:
JOHN W. STUFFT,
by: Donald G. Dalton
his Attorney.

Patented Sept. 30, 1952

2,612,286

UNITED STATES PATENT OFFICE 2,612,286

CLOSURE AND SEAL THEREFOR

John W. Stufft, McKeesport, Pa., assignor to United States Steel Corporation, a corporation of New Jersey Application April 29, 1947, Serial No. 744,596

1 Claim. (Cl. 220—46)

This invention relates to collapse testing of pipe wherein a section of pipe is subjected to sufficient external pressure to collapse it and to thereby determine its collapse resistance.

All pipe or casing used in deep wells must have a determined resistance to failure by reason of external pressures thereon. In order to determine this resistance to collapse so that a reasonable factor of safety can be attained in setting the casing to great depths, a number of collapse tests are made on pipe from each heat of steel. These tests may be and generally are carried to destruction.

It is accordingly an object of this invention to provide a simple and efficient device and manner of making collapse tests on pipe, such as oil well casing.

The foregoing and further objects will be apparent from reading the following specification in conjunction with the attached drawing, wherein:

Figure 1 is a longitudinal section of testing apparatus;

Figure 2 is a longitudinal section of a test piece and test head; and

Figure 3 is an end view on lines III—III of Figure 2.

Referring more particularly to the drawing, the numeral 2 designates a heavy-walled cylindrical member having closures or heads 4 providing a testing chamber 6 in the interior thereof. At least one of the heads is provided with a removable insert member 8 permitting the insertion and removal of test pieces 10 from the testing chamber 6. The cylindrical member 2 is provided with at least one inlet 12 for the admission of water under pressure from a suitable source (not shown) and a vent 14 for permitting the escape of air from the chamber 6 while it is being filled with test fluid.

The test pieces 10 may be short sections of oil well casing which permits the determination of the collapse resistance of the casing without destroying an entire section of casing. Adapted to be disposed on the ends of the test pieces are the improved packing heads 20 of my invention. These are preferably formed of a section of round bar stock which is counterbored on one side to provide an annular shoulder or flange 22 which encompasses the recess 24. An annular elastic gasket 26 composed of rubber-like material having an inner diameter about the same as the outer diameter of the test piece, is mounted on the end of the annular shoulder or flange 22 by means of an annular face plate 28 and bolts 30. The face plate or compression ring 28 has sufficient clearance to permit ready insertion of the end of a test piece. A sealing gasket 32 of paper or the like may be disposed between the end of the test piece and the sealing head to compensate for irregularities in the end of the test piece.

In making collapse tests with the foregoing apparatus, heads 20 are placed over both ends of a test piece and the bolts 30 tightened to compress the rubber gaskets 26 causing them to tightly grip the test piece. The test piece is then inserted in the chamber 6 and the removable head 8 is moved into the closed position. The chamber 6 is then filled with water after which gradually increasing pressure is applied thereto until the test piece collapses. The head 8 is then removed and the test piece removed for examination.

By way of specific example, the test piece may be a piece of steel pipe which is 7 inches in outside diameter by .540 inch wall by 7 feet in length (that is, 12 times the pipe diameter). While the test chamber is filling with water, the gaskets 26 act as a seal to prevent water from entering the inside of the test specimen. When the chamber is filled, pressure from a 2000 lb. accumulator may be applied by opening a valve to a high pressure line connected to the accumulator. Under such chamber pressure, the heads have exerted upon them 2,000 lbs. times the transverse external area of the 7 inch O. D. test piece, or 77,000 lbs. pressing against the face of each head 20. This unbalanced pressure which is the differential between the pressure within the specimen in the test chamber and that exerted against the heads on the test piece is, of course, always in the ratio of the test specimen's external transverse area to one. Taking advantage of the unbalanced pressure thus set up is the principle on which these heads function. After this pressure is applied, a high pressure pump is connected to the chamber to gradually increase the pressure. As the pressure increases, the unbalanced pressure likewise increases to maintain a positive seal by forcing the heads against the ends of the test specimen, the gasket 32 compensating for any irregularities between the two. The chamber pressure required to overcome the resistance of such a test specimen is approximately 15,000 lbs. p. s. i. Such a pressure causes an unbalanced pressure of 577,500 lbs. to be exerted against the heads on the ends of the test specimen but leaves the specimen free to collapse when the pressure becomes too great for its resistance. When the specimen collapses, the partial vacuum and the unbalanced pressure is suddenly overcome causing a loud report and a severe shock on the heads.

These heads have replaced the costly welded on heads heretofore used. In addition to the expense, such heads had a restraining influence on the collapsing of the test specimens. This necessitated deducting some arbitrary amount from the collapsing pressure due to the added strength of the welded heads. However, with my improved head members accurate results at low cost are readily obtainable.

While I have shown and described one specific embodiment of my invention, it will be understood that this embodiment is merely for the purpose of illustration and description and that various other forms may be devised within the scope of my invention, as defined in the appended claim.

I claim:

A closure head for closing the ends of plain end pipe sections against fluid test pressure applied thereto to collapse the pipe, said head being designed to seal the ends only of the pipe against the test pressure without affecting the pressure required to cause collapsing of the pipe sections, said head comprising a metal disc member of larger diameter than the pipe to be tested, a counterbore on one side of said disc forming an annular flange around the outer edge thereof, said counterbore being adapted to receive and closely encompass throughout the depth thereof an end portion of a pipe section to be tested, the bottom of said counterbore being adapted to abut the annular end portion of the pipe, an annular elastic sealing gasket on the end of said annular flange, said gasket having approximately the same inside diameter as the outside diameter of a pipe to be tested, means to compress said gasket to lessen the inside diameter thereof to hold said head on a pipe to be tested and initially seal the inside of the pipe from the testing fluid said means comprising a ring member having a bolted connection to said head, said ring member being adapted to closely encompass the pipe through the full width of said ring, and a removable circular gasket disposed in the bottom of said counterbore adapted to be compressed between the annular end portion of a pipe section to be tested and said head and seal the inside of the pipe section from the test fluid when the full test pressure is applied thereto.

JOHN W. STUFFT.

REFERENCES CITED

The following references are of record in the file of this patent:

UNITED STATES PATENTS

| Number | Name | Date |
|---|---|---|
| 428,364 | Baguley | May 20, 1890 |
| 569,247 | Smith | Oct. 13, 1896 |
| 608,613 | Linich | Aug. 9, 1898 |
| 794,987 | Kneuper | July 18, 1905 |
| 795,319 | Vanderman | July 25, 1905 |
| 1,222,817 | Sobraske | Apr. 17, 1917 |
| 1,757,724 | Larson | May 6, 1930 |
| 1,953,033 | Widmer | Mar. 27, 1934 |
| 2,394,875 | Rommel | Feb. 12, 1946 |
| 2,559,564 | Sperling | July 3, 1951 |